No. 775,584. PATENTED NOV. 22, 1904.
A. C. STEBBINS.
CASTER.
APPLICATION FILED SEPT. 20, 1901.
NO MODEL.

Witnesses:
Otis A. Earl
D. E. Wood.

Inventor,
Arthur C. Stebbins
By Fred L. Chappell
Atty.

No. 775,584. Patented November 22, 1904.

UNITED STATES PATENT OFFICE.

ARTHUR C. STEBBINS, OF LANSING, MICHIGAN.

CASTER.

SPECIFICATION forming part of Letters Patent No. 775,584, dated November 22, 1904.

Application filed September 20, 1901. Serial No. 75,895. (No model.)

*To all whom it may concern:*

Be it known that I, ARTHUR C. STEBBINS, a citizen of the United States, residing at the city of Lansing, in the county of Ingham and State of Michigan, have invented certain new and useful Improvements in Casters, of which the following is a specification.

This invention relates to improvements in casters, and particularly to those of the ball-bearing type.

The objects of the invention are to provide a caster of the ball-bearing type in which the parts may be easily and quickly assembled and adjusted and which is simple in its structure and cheap to manufacture and at the same time very strong and durable.

Further objects will definitely appear in the detailed description to follow.

I accomplish the objects of my invention by the devices and means described in this specification.

The invention is clearly defined, and pointed out in the claims.

A structure embodying the features of my invention is fully illustrated in the accompanying drawings, forming a part of this specification, in which—

Figure 1:
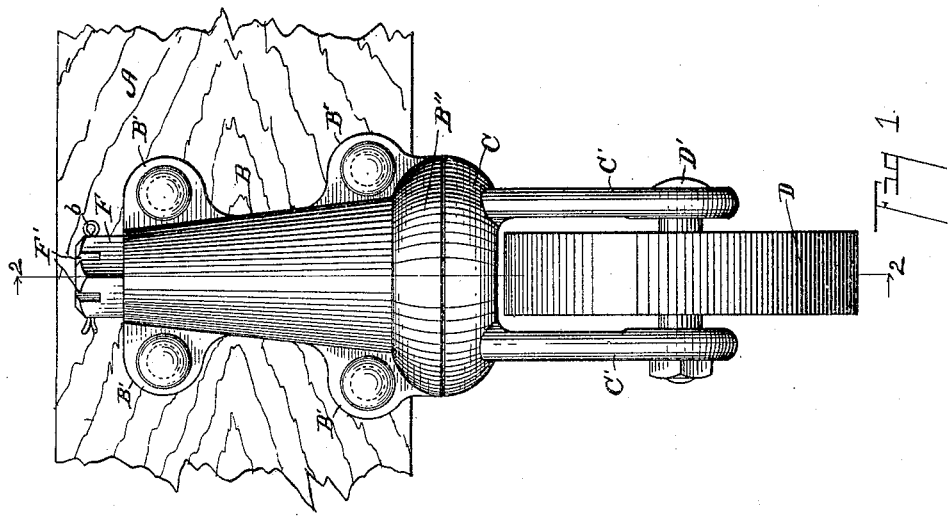
Figure 2:
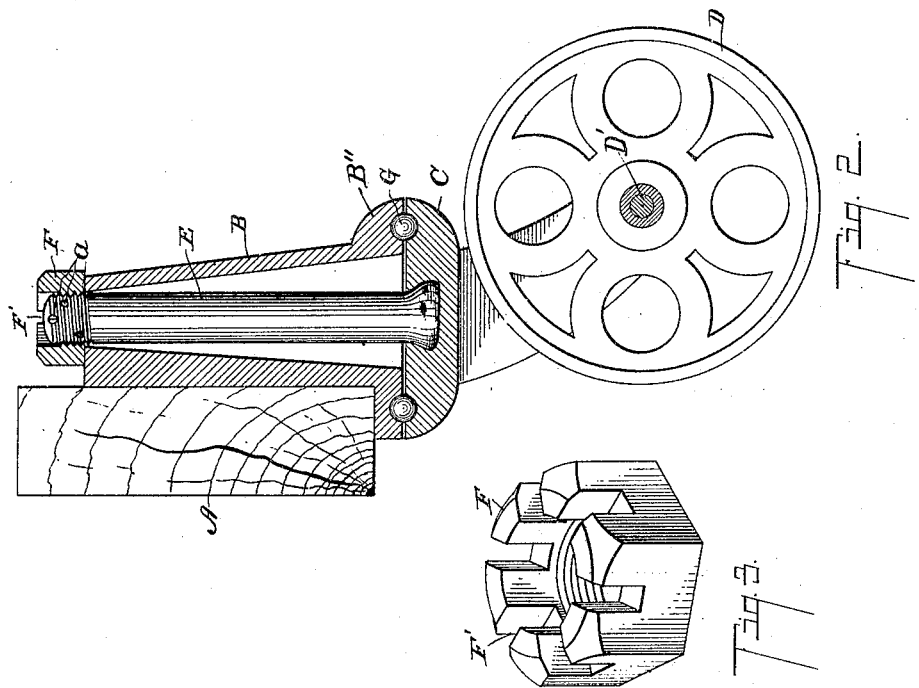
Figure 3:
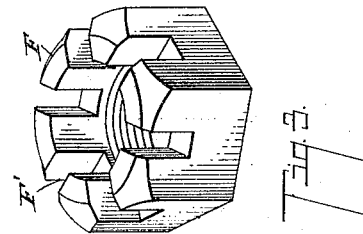

Figure 1 is a horizontal perspective view of a caster embodying the features of my invention. Fig. 2 is a detail horizontal sectional view of the same, taken on line 2 2 of Fig. 1. Fig. 3 is an enlarged perspective view of the adjustment-nut F.

In the drawings the sectional view is taken looking in the direction of the little arrows at the end of the section-line, and similar letters of reference refer to similar parts throughout the several views.

Referring to the lettered parts of the drawings, A represents the frame or block to which the caster is secured in position for use.

B is a sleeve or shell, having perforated lugs or ears B', by which the caster is secured to the frame or block on which it is to be used. The lower end of this sleeve or shell is extended at B", and a ball-race is formed therein.

The plate C is provided with downwardly-depending forks C' C', between which on a suitable spindle D' is the wheel D. The upper surface of the plate C is provided with a ball-race corresponding to the one above, and balls G are provided therein. The shank E of the caster is a bolt which is embedded in the casting C and extends above the sleeve B when inserted therethrough. It is screw-threaded on its upper end to receive the nut F, and the screw-threaded portion has transverse perforations $a$ to receive the pin-key $b$. The nut F is notched, as at F', on its upper surface. By adjusting nut F the parts of the caster are brought into proper relation, and the key $b$ is then inserted through one of the perforations in the end of the shank and engages the nut F in the slots F' and so locks the parts. Wear is compensated for in this way, and the manufacture is greatly facilitated, as the parts do not have to be accurately fitted in order to make a satisfactory caster.

It is preferred in the manufacture of the article to form the shank E by embedding the head of the bolt in the plate C when the same is cast. However, it may be formed integral or of the same material as the plate C. This structure is designed particularly for heavy casters and is very strong and durable. However, it is apparent that the same may be applied to lighter casters with advantage. I have described the same in detail in the form that I believe to be the most practical. I am aware, however, that it is capable of considerable variation without departing from my invention.

Having thus described my invention, what I claim as new, and desire to secure by Letters Patent, is—

1. In a caster, the combination of the sleeve B; a plate C, having depending forks C' and an upwardly-projecting shank E, screw-threaded on its upper end, adapted to be inserted through the said sleeve; a nut F therefor having notches as at F', in its upper surface; a key adapted to be inserted through suitable perforations in the said shank to engage the notches in the said nut; and suitable ball-bearings between said sleeve and plate, substantially as described.

2. In a caster, the combination of the sleeve B; a plate C, having depending forks C' and an upwardly-projecting shank E, screw-threaded on its upper end, adapted to be inserted through the said sleeve; a nut F therefor having notches as at F', in its upper surface; a key adapted to be inserted through suitable perforations in the said shank to engage the notches in the said nut; and suitable bearings between said sleeve and plate, substantially as described.

3. In a caster, the combination of the sleeve B; a plate C, having depending forks C' and an upwardly-projecting shank E formed of a bolt around the head of which the plate C is cast, adapted to be inserted through the said sleeve; a nut F therefor having notches as at F', in its surface; a key adapted to be inserted through suitable perforations in the said shank to engage the notches in the said nut; and suitable bearings between said sleeve and plate, substantially as described.

In witness whereof I have hereunto set my hand and seal in the presence of two witnesses.

ARTHUR C. STEBBINS. [L. S.]

Witnesses:
MINNIE S. BRIGGS,
W. B. WARREN.